United States Patent
Kim

(10) Patent No.: US 10,672,344 B2
(45) Date of Patent: Jun. 2, 2020

(54) DISPLAY DEVICE DISPLAYING A PLURALITY OF PATTERNS RECEIVING LUMINANCE AND COLOR COORDINATES DATA FOR SAID PATTERNS FROM AN EXTERNAL USER DEVICE

(71) Applicant: LG Display Co., Ltd., Seoul (KR)

(72) Inventor: Hyung-Jung Kim, Seoul (KR)

(73) Assignee: LG Display Co., Ltd., Seoul (KR)

(*) Notice: Subject to any disclaimer, the term of this patent is extended or adjusted under 35 U.S.C. 154(b) by 105 days.

(21) Appl. No.: 15/380,654

(22) Filed: Dec. 15, 2016

(65) Prior Publication Data
US 2017/0193920 A1    Jul. 6, 2017

(30) Foreign Application Priority Data
Dec. 31, 2015 (KR) .................. 10-2015-0191135

(51) Int. Cl.
*G09G 3/3291* (2016.01)
*G09G 3/3225* (2016.01)
(Continued)

(52) U.S. Cl.
CPC .......... *G09G 3/3291* (2013.01); *G01J 1/0219* (2013.01); *G01J 1/0233* (2013.01); *G01J 1/0488* (2013.01); *G01J 1/30* (2013.01); *G01J 3/0272* (2013.01); *G01J 3/506* (2013.01); *G09G 3/2003* (2013.01); *G09G 3/3208* (2013.01);
(Continued)

(58) Field of Classification Search
CPC ... G09G 2320/0242; G09G 2320/0626; G09G 2320/0666; G09G 2320/0693; G09G 2360/145; H04N 17/00
See application file for complete search history.

(56) References Cited

U.S. PATENT DOCUMENTS 5,488,434 A * 1/1996 Jung ................. H04N 5/44
                                              348/603
9,059,337 B1 * 6/2015 Robinson ............ H01L 33/0004
(Continued)

FOREIGN PATENT DOCUMENTS

CN    102376245 A    3/2012
CN    102379002 A    3/2012
(Continued)

OTHER PUBLICATIONS

Notification of First Office Action with English Translation dated Sep. 3, 2018 issued in Chinese Patent Application No. 201611225802.8, 23 Pages.
(Continued)

*Primary Examiner* — Kent W Chang
*Assistant Examiner* — Nathaniel P Brittingham
(74) *Attorney, Agent, or Firm* — Polsinelli PC

(57) ABSTRACT

Disclosed is an optical compensation system comprising a user terminal device, and a display device for obtaining luminance data and color coordinates data by the use of user terminal device, and generating compensation data for compensating a deterioration of an organic light emitting diode based on obtained luminance data and color coordinates data and storing the compensation data, whereby it enables an optical compensation even after shipment of products, and it provides high-definition viewing quality to a user for a long time.

17 Claims, 9 Drawing Sheets

(51) Int. Cl.
  *G09G 3/3208* (2016.01)
  *G01J 3/50* (2006.01)
  *G01J 1/30* (2006.01)
  *G01J 3/02* (2006.01)
  *G01J 1/02* (2006.01)
  *G01J 1/04* (2006.01)
  *G09G 3/20* (2006.01)
  *G09G 3/3266* (2016.01)
  *G09G 5/10* (2006.01)
  *G01J 1/42* (2006.01)

(52) U.S. Cl.
  CPC ......... *G09G 3/3225* (2013.01); *G09G 3/3266* (2013.01); *G09G 5/10* (2013.01); *G01J 2001/4247* (2013.01); *G09G 2320/0233* (2013.01); *G09G 2320/0242* (2013.01); *G09G 2320/0626* (2013.01); *G09G 2320/0666* (2013.01); *G09G 2340/06* (2013.01); *G09G 2360/144* (2013.01)

(56) References Cited

U.S. PATENT DOCUMENTS

| | | | | |
|---|---|---|---|---|
| 9,378,678 B1* | 6/2016 | Lee | | G09G 3/2003 |
| 2004/0183759 A1* | 9/2004 | Stevenson | | G02B 6/43 |
| | | | | 345/82 |
| 2004/0196303 A1 | 10/2004 | Matsuda | | |
| 2006/0007239 A1* | 1/2006 | Harrison | | G09G 5/02 |
| | | | | 345/590 |
| 2006/0187195 A1* | 8/2006 | Chung | | G09G 5/10 |
| | | | | 345/156 |
| 2006/0280360 A1* | 12/2006 | Holub | | G01J 3/02 |
| | | | | 382/162 |
| 2008/0062164 A1* | 3/2008 | Bassi | | H04N 9/3147 |
| | | | | 345/214 |
| 2009/0237572 A1* | 9/2009 | Kishimoto | | G02F 1/13318 |
| | | | | 348/734 |
| 2009/0262063 A1* | 10/2009 | Fujine | | G09G 3/3406 |
| | | | | 345/102 |
| 2010/0053136 A1* | 3/2010 | Ohta | | G09G 3/3413 |
| | | | | 345/211 |
| 2010/0201275 A1 | 8/2010 | Cok et al. | | |
| 2010/0265262 A1* | 10/2010 | Choe | | G09G 3/342 |
| | | | | 345/589 |
| 2011/0254874 A1* | 10/2011 | Kikuta | | G09G 3/2092 |
| | | | | 345/690 |
| 2012/0074851 A1* | 3/2012 | Erinjippurath | | G09G 3/20 |
| | | | | 315/158 |
| 2012/0127324 A1* | 5/2012 | Dickins | | G09G 3/006 |
| | | | | 348/191 |
| 2012/0194565 A1 | 8/2012 | White et al. | | |
| 2012/0242680 A1 | 9/2012 | Park | | |
| 2013/0120330 A1* | 5/2013 | Kang | | G09G 5/10 |
| | | | | 345/207 |
| 2013/0135272 A1* | 5/2013 | Park | | G09G 3/3233 |
| | | | | 345/211 |
| 2013/0176326 A1* | 7/2013 | Safaee-Rad | | G06T 11/001 |
| | | | | 345/590 |
| 2013/0194199 A1* | 8/2013 | Lynch | | G06F 3/0412 |
| | | | | 345/173 |
| 2013/0307995 A1* | 11/2013 | Nakata | | H04N 9/3194 |
| | | | | 348/189 |
| 2013/0314447 A1* | 11/2013 | Wu | | G09G 5/02 |
| | | | | 345/690 |
| 2013/0329057 A1* | 12/2013 | Al-Dahle | | H04N 17/00 |
| | | | | 348/189 |
| 2014/0055500 A1* | 2/2014 | Lai | | G09G 3/3208 |
| | | | | 345/690 |
| 2014/0306979 A1 | 10/2014 | Chun et al. | | |
| 2014/0333681 A1 | 11/2014 | Oh | | |
| 2015/0194105 A1* | 7/2015 | Han | | G02F 1/1309 |
| | | | | 345/690 |
| 2015/0317928 A1* | 11/2015 | Safaee-Rad | | G09G 3/2003 |
| | | | | 345/593 |
| 2015/0317944 A1* | 11/2015 | Safaee-Rad | | G09G 5/02 |
| | | | | 345/595 |
| 2015/0379922 A1* | 12/2015 | Zhang | | G09G 3/3208 |
| | | | | 345/690 |
| 2016/0037158 A1* | 2/2016 | Sugimoto | | H04N 17/002 |
| | | | | 348/188 |
| 2016/0125781 A1* | 5/2016 | Yang | | G09G 3/2003 |
| | | | | 345/694 |
| 2016/0267838 A1* | 9/2016 | Zhang | | G09G 3/2003 |
| 2017/0076659 A1* | 3/2017 | Zhang | | G09G 3/3208 |
| 2017/0140556 A1* | 5/2017 | Safaee-Rad | | G06T 11/001 |
| 2017/0193920 A1* | 7/2017 | Kim | | G09G 3/2003 |
| 2018/0005587 A1* | 1/2018 | Ge | | G09G 3/3291 |

FOREIGN PATENT DOCUMENTS

| | | |
|---|---|---|
| CN | 102473396 A | 5/2012 |
| CN | 105096816 A | 11/2015 |
| JP | 2004-228645 A | 8/2004 |
| JP | 2004-228948 A | 8/2004 |
| JP | 2007-140534 A | 6/2007 |
| JP | 2009-134142 A | 6/2009 |
| JP | 2011-053634 A | 3/2011 |

OTHER PUBLICATIONS

Chinese Office action issued in co-pending Chinese Patent Application No. 201611225802.8 dated Oct. 8, 2019.

* cited by examiner

DISPLAY DEVICE DISPLAYING A PLURALITY OF PATTERNS RECEIVING LUMINANCE AND COLOR COORDINATES DATA FOR SAID PATTERNS FROM AN EXTERNAL USER DEVICE

CROSS REFERENCE TO RELATED APPLICATIONS

This application claims the priority of the Korean Patent Application No. 10-2015-0191135 filed on Dec. 31, 2015, which is hereby incorporated by reference in its entirety as if fully set forth herein.

BACKGROUND

Field of the Disclosure

The present disclosure relates to a display device, and more particularly, to a display device, an optical compensation system and an optical compensation method thereof. Although the present disclosure is suitable for a wide scope of applications, it is particularly suitable for compensating for a picture quality by a user through a user terminal device.

Discussion of the Background

With the recent advancement of multimedia, there is an increasing importance and demand for a flat panel display device. In order to satisfy this increasing demand, various flat panel display devices such as a liquid crystal display device, a plasma display device and an organic light emitting display device are practically used. Among the various flat panel display devices, the organic light emitting display device has been attracted great attentions owing to a rapid response speed and a low power consumption. In addition, since the organic light emitting display device is a self-light emission device, there is no problem related with a viewing angle. In this respect, the organic light emitting display device has been attracted as a next-generation flat panel display device.

Generally, the organic light emitting display device includes a display panel having a plurality of pixels, and a panel driver for driving each pixel so as to emit light. In this case, each pixel is provided in every pixel region defined by crossing a plurality of data lines and a plurality of scan lines.

As shown in FIG. 1, each pixel may include a switching transistor (Tsw), a driving transistor (Tdr), a capacitor (Cst), and an organic light emitting diode (OLED).

The switching transistor (Tsw) is switched by a scan signal (S) supplied to a scan line (SL), and the switching transistor (Tsw) supplies a data voltage (Vdata), which is provided to a data line (DL), to the driving transistor (Tdr).

The driving transistor (Tdr) is switched by the data voltage (Vdata) supplied from the switching transistor (Tsw), and the driving transistor (Tdr) controls a data current (Ioled) flowing to the organic light emitting diode (OLED) by a driving voltage (VDD).

The capacitor (Cst) is connected between gate and source terminals of the driving transistor (Tdr), wherein the capacitor (Cst) stores a voltage corresponding to the data voltage (Vdata) supplied to the gate terminal of the driving transistor (Tdr), and turns-on the driving transistor (Tdr) by the use of stored voltage.

The organic light emitting diode (OLED) is electrically connected to a source terminal of the driving transistor (Tdr) and a cathode electrode (CE) supplied with a cathode voltage (VSS), wherein the organic light emitting diode (OLED) emits light by the data current (Ioled) supplied from the driving transistor (Tdr).

Each pixel of the organic light emitting display device according to the related art controls an intensity of the data current (Ioled) flowing in the organic light emitting diode (OLED) by switching the driving transistor (Tdr) according to the data voltage (Vdata), so that the organic light emitting diode (OLED) emits light, thereby displaying a predetermined image.

FIG. 2 illustrates luminance properties of the organic light emitting display device according to the related art.

As shown in FIG. 2, in case of the organic light emitting display device according to the related art, a deterioration speed of the organic light emitting diode (OLED) is accelerated in accordance with the increase of driving time, thereby deteriorating the luminance properties. With the passage of time, a picture quality of the organic light emitting display device according to the related art is deteriorated due to the deterioration of organic light emitting diode (OLED).

Generally, a picture quality compensation for the organic light emitting display device is carried out by an additional process prior to shipping fully manufactured products. However, the organic light emitting diode (OLED) is gradually deteriorated with the passage of time, and thus the luminance is deteriorated. That is, it causes a problem related to the deterioration of picture quality after shipping fully manufactured products.

In case of the organic light emitting display device according to the related art, it is difficult to compensate for the deterioration of picture quality in accordance with the deterioration of the organic light emitting diode (OLED) after shipping fully manufactured products.

The above description for the related art is possessed by a present inventor in the process of developing a present disclosure, that is, the above description for the related art is technical information obtained during the process of developing the present disclosure. Thus, the above description for the related art is not a prior art generally known to the public prior to filing the current application based on the present disclosure.

SUMMARY

Accordingly, aspects of the present disclosure are directed to a display device, an optical compensation system, and an optical compensation method that substantially obviate one or more problems due to limitations and disadvantages of the prior art.

An aspect of the present disclosure is directed to provide a display device which is capable of carrying out a picture quality compensation by a user, an optical compensation system, and an optical compensation method thereof.

Additional advantages and features of aspects of the disclosure will be set forth in part in the description which follows and in part will become apparent to those having ordinary skill in the art upon examination of the following or may be learned from practice of embodiments of the disclosure. The objectives and other advantages of aspects of the disclosure may be realized and attained by the structure particularly pointed out in the written description and claims hereof as well as the appended drawings.

To achieve these and other advantages and in accordance with the purpose of aspects of the disclosure, as broadly described herein, there is provided a display device that may include a display panel for sequentially displaying a plurality of patterns, and an optical compensation part for receiving luminance data and color coordinates data for each of the plurality of patterns from an external user terminal device, and generating compensation data by the use of luminance data and color coordinates data.

In another aspect of the present disclosure, there is provided an optical compensation system that may include a user terminal device for measuring luminance and color coordinates, and a display device for sequentially displaying a plurality of patterns, receiving luminance data and color coordinates data for each of the plurality of patterns from the user terminal device, and generating compensation data by the use of luminance data and color coordinates data and storing the compensation data.

In another aspect of an aspect of the present disclosure, there is provided an optical compensation method that may include displaying an image by the use of initially-set data for an image display mode; if the image display mode is changed into an optical compensation mode, sequentially displaying a plurality of patterns, receiving luminance data and color coordinates data for each of the plurality of patterns from an external user terminal device, and generating compensation data by the use of luminance data and color coordinates data and storing the compensation data; and if the optical compensation mode is changed into the image display mode, displaying an image by the use of compensation data.

It is to be understood that both the foregoing general description and the following detailed description of aspects of the present disclosure are exemplary and explanatory and are intended to provide further explanation of the disclosure as claimed.

BRIEF DESCRIPTION OF THE DRAWINGS

The accompanying drawings, which are included to provide a further understanding of aspects of the disclosure and are incorporated in and constitute a part of this application, illustrate aspect(s) of the disclosure and together with the description serve to explain the principle of aspects of the disclosure.

In the drawings.

DETAILED DESCRIPTION OF THE DISCLOSURE

Reference will now be made in detail to the exemplary aspects of the present disclosure, examples of which are illustrated in the accompanying drawings. Wherever possible, the same reference numbers will be used throughout the drawings to refer to the same or like parts.

On explanation about the aspects of the present disclosure, the following details about the terms should be understood.

The term of a singular expression should be understood to include a multiple expression as well as the singular expression if there is no specific definition in the context. If using the term such as "the first" or "the second", it is to separate any one element from other elements. Thus, a scope of claims is not limited by these terms.

Also, it should be understood that the term such as "include" or "have" does not preclude existence or possibility of one or more features, numbers, steps, operations, elements, parts or their combinations.

It should be understood that the term "at least one" includes all combinations related with any one item. For example, "at least one among a first element, a second element and a third element" may include all combinations of the two or more elements selected from the first, second and third elements as well as each element of the first, second and third elements.

If it is mentioned that a first element is positioned "on or above" a second element, it should be understood that the first and second elements may be brought into contact with each other, or a third element may be interposed between the first and second elements.

Hereinafter, a display device according to aspects of the present disclosure, an optical compensation system, and an optical compensation method thereof will be described in detail with reference to the accompanying drawings.

Figure 3:
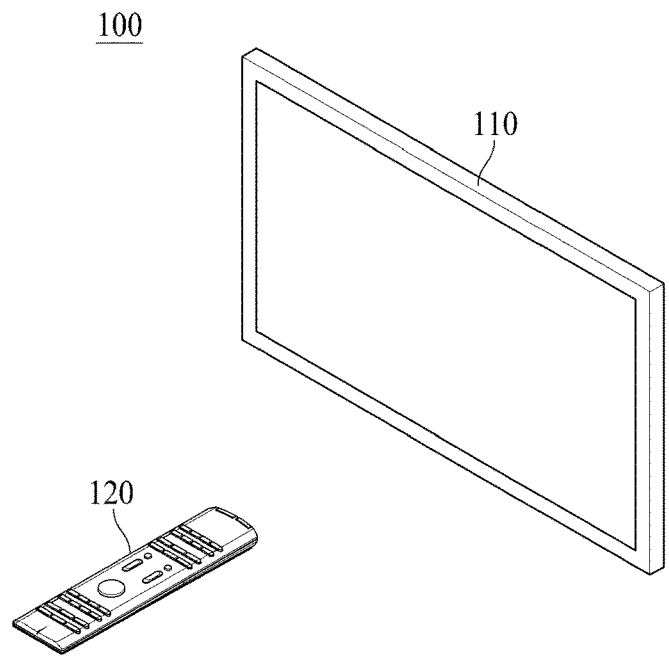
FIG. 3 illustrates an optical compensation system according to an aspect of the present disclosure.

FIG. 3 illustrates a diagram of an optical compensation system according to an aspect of the present disclosure.

Referring to FIG. 3, the optical compensation system 100 according to an aspect of the present disclosure may include a display device 110 and a user terminal device 120.

First, the display device 110 may be driven in any one of an image display mode and an optical compensation mode. For the image display mode, the display device 110 displays an image to be watched by a user.

If the image display mode is changed into the optical compensation mode, the display device 110 sequentially displays a plurality of patterns which are previously stored for an optical compensation. The display device 110 receives luminance data and color coordinates data for each pattern from the user terminal device 120, and generates and stores compensation data.

If it is changed into the image display mode, the display device 110 displays an image by the use of the compensation data generated for the optical compensation mode.

Then, the user terminal device 120 may be driven in any one of the image display mode and the optical compensation mode. For the image display mode, the user terminal device 120 transmits a control signal, which is generated by a user's input, to the display device 110. Accordingly, the user terminal device 120 may control an image displayed in the display device 110.

If the user terminal device 120 receives a request for optical compensation data from the display device 110 for the optical compensation mode, the user terminal device 120 measures luminance for the pattern displayed in the display device 110, and its color coordinates. Then, the user terminal device 120 generates luminance data and color coordinates data, and transmits the generated luminance data and color coordinates data to the display device 110.

Figure 4:
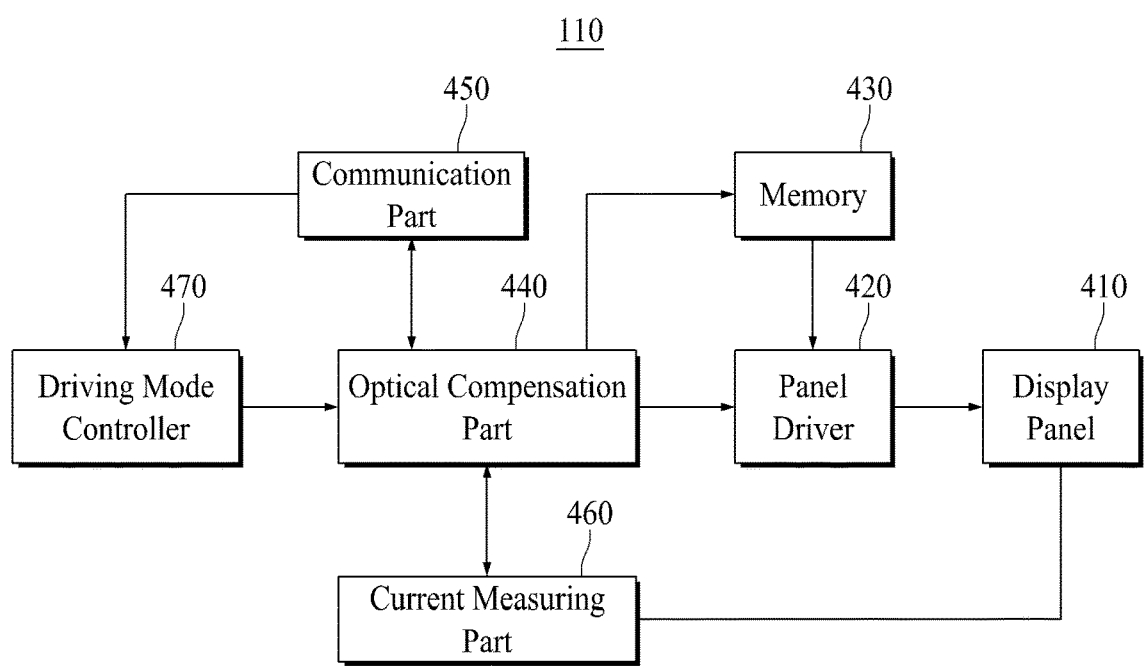
FIG. 4 illustrates a diagram of a display device of FIG. 3.
Figure 5:
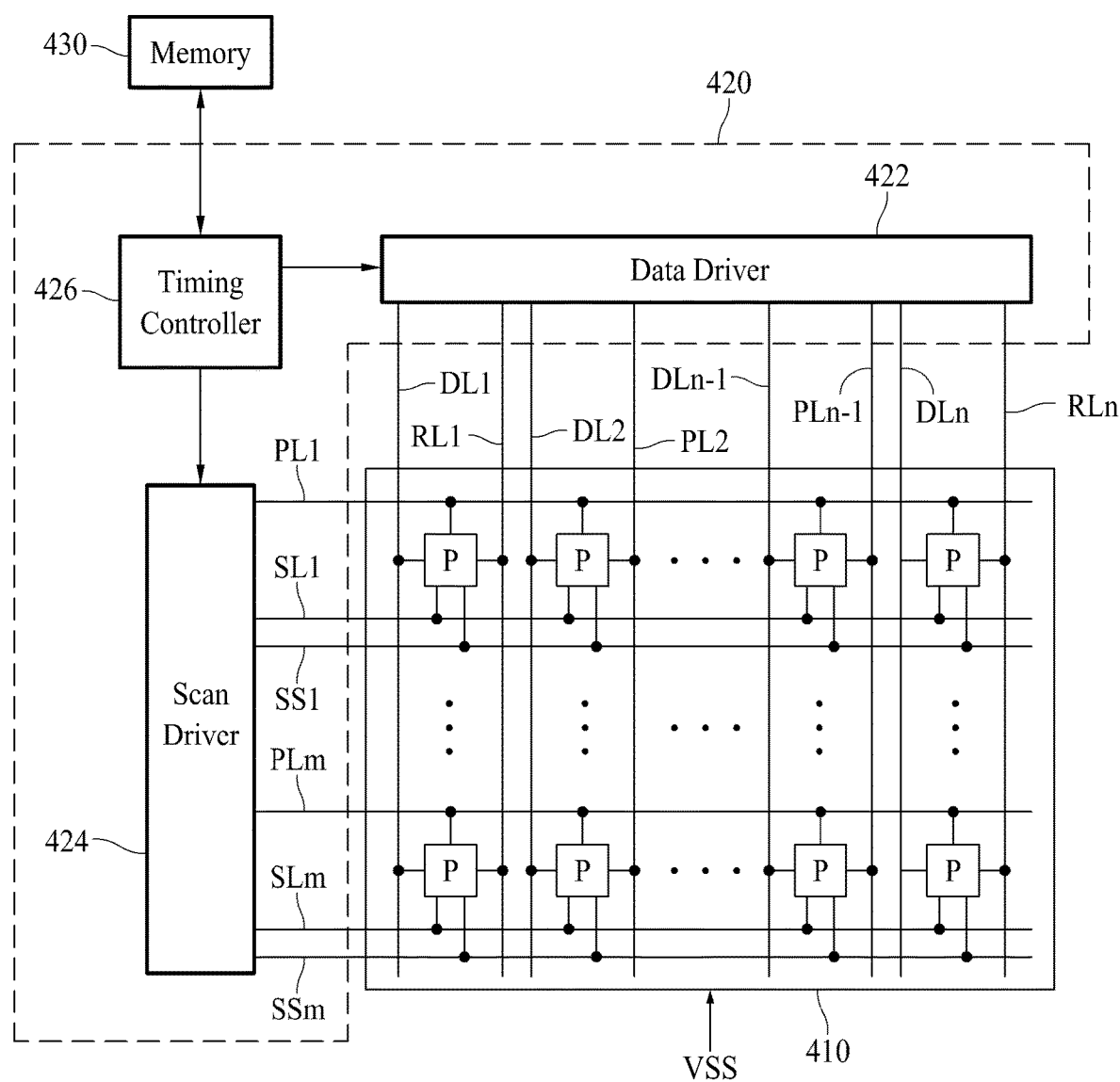
FIG. 5 illustrates a circuit diagram of a display panel including a panel driver of FIG. 4.

FIG. 4 illustrates a diagram of the display device of FIG. 3, and FIG. 5 illustrates a circuit diagram of a display panel and a panel driver shown in FIG. 4.

Referring to FIG. 4, the display device 110 according to an aspect of the present disclosure may include a display panel 410, a panel driver 420, a memory 430, an optical compensation part 440, a communication part 450, a current measuring part 460, and a driving mode controller 470.

First, an image or pattern is displayed on the display panel 410 under the condition of the panel driver 420. More specifically, if the display device 110 is driven in the image display mode, the panel driver 420 displays the image on the display panel 410. Meanwhile, if the display device 110 is driven in the optical compensation mode, the panel driver 420 sequentially displays the plurality of patterns on the display panel 410.

As shown in FIG. 5, the display panel 410 may include a plurality of scan lines (SL), a plurality of sensing lines (SS), a plurality of data lines (DL), a plurality of driving voltage lines (PL), a plurality of reference voltage lines (RL), and a plurality of pixels (P).

The plurality of data lines (DL) may intersect the plurality of scan lines (SL) and the plurality of sensing lines (SS). The plurality of scan lines (SL) may be parallel to the plurality of sensing lines (SS).

Each of the plurality of pixels (P) may be any one among red, green, blue, and white pixels. Also, one unit pixel may be defined by the red, green, blue, and white pixels. Each pixel (P) may be connected with one of the data lines (DL), one of the driving voltage lines (PL), and one of the reference voltage lines (RL).

Figure 1:
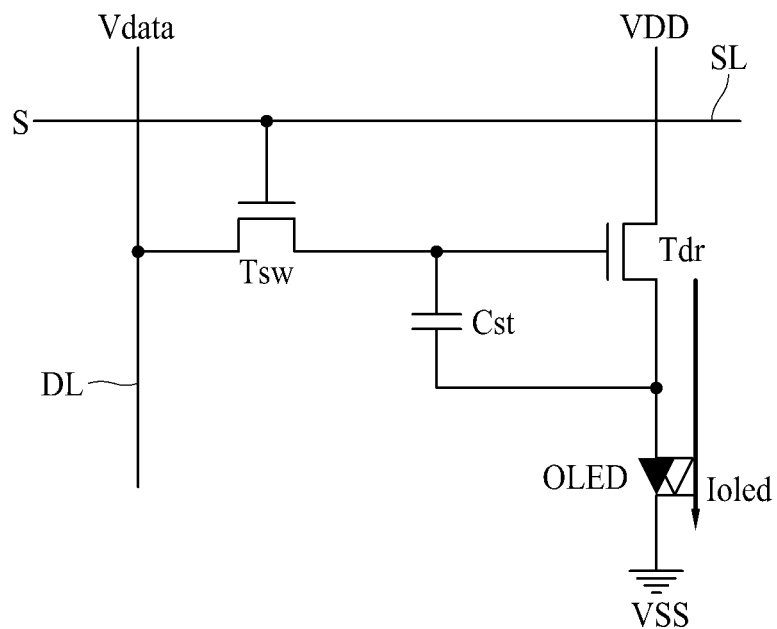
FIG. 1 is a circuit diagram illustrating a pixel structure of an organic light emitting display device according to the related art.
Figure 2:
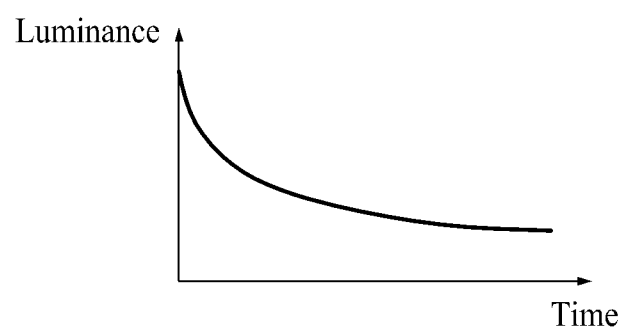
FIG. 2 is a graph showing luminance properties of the organic light emitting display device according to the related art.

A data voltage is supplied from the data line (DL) to the pixel (P), and the pixel (P) supplies a current based on the data voltage to the organic light emitting diode (OLED). Accordingly, the pixel (P) emits light with a predetermined luminance. A structure of the pixel (P) has been described with reference to FIG. 1, whereby a detailed description for the pixel structure will be omitted.

Then, if image data or pattern data is input to the panel driver 420, an image corresponding to the image data or a pattern corresponding to the pattern data is displayed on the display panel 410 under the control of the panel driver 420.

As shown in FIG. 5, the panel driver 420 may include a data driver 422, a scan driver 424, and a timing controller 426.

The scan driver 424 is connected with the plurality of scan lines (SL), wherein the scan driver 424 supplies scan signals to the plurality of scan lines (SL). The scan driver 424 supplies the scan signals to the plurality of scan lines (SL) in accordance with a timing scan control signal which is provided from the timing controller 426. The scan driver 424 may sequentially supply the scan signals to the plurality of scan lines (SL). In this case, the scan driver 424 may include a shift register.

The scan driver 424 may be formed of a driving chip such as an integrated circuit, and may be mounted on a flexible film attached to the display panel 410. Also, the scan driver 424 including a plurality of transistors may be directly formed on a non-display area of the display panel 410 by a GIP (Gate Driver In Panel) method.

The data driver 422 is connected with the plurality of data lines (DL), wherein the data driver 422 supplies data voltages to the plurality of data lines (DL). The data driver 422 receives a timing data control signal and correction data from the timing controller 426. The data driver 422 converts the correction data into the data voltages, and supplies the data voltages to the data lines (DL). In this case, the data voltage is provided to make the organic light emitting diode (OLED) of the pixel (P) emit light with a predetermined luminance. If the 8-bit correction data is supplied to the data driver 422, each of the data voltages may be any one among 256 voltages.

The data driver 422 may be formed of a driving chip such as an integrated circuit, and may be mounted on a flexible film attached to the display panel 410 or may be directly attached to the display panel 410.

The timing controller 426 generates timing control signals for controlling an operation timing of the scan driver 424 and the data driver 422. The timing control signals may include a data timing control signal for controlling the operation timing of the data driver 422, and a scan timing control signal for controlling the operation timing of the scan driver 424.

The timing controller 426 receives image data from the external user terminal device 120, or receives pattern data from the optical compensation part 440. The timing controller 426 corrects the image data or pattern data by the use of data stored in the memory 430, to thereby generate the correction data.

Before carrying out the optical compensation, initially-set data, which is preset before shipment of fully manufactured products, is stored in the memory 430. In this case, according to the input of the image data, the timing controller 426 corrects the image data to the correction data by the use of initially-set data.

After carrying out the optical compensation, the compensation data for compensating the deterioration of the organic light emitting diode (OLED) is stored in the memory 430. In this case, according to the input of the image data, the timing controller 426 corrects the image data to the correction data by the use of compensation data, to thereby compensate for the deterioration of the organic light emitting diode (OLED).

Then, the initially-set data or compensation data is stored in the memory 430. In this case, the initially-set data is set and is stored in the memory 430 for an initial optical compensation process before shipment of the display device 110.

The memory 430 stores the initially-set data until shipment of the display device 110, and the memory 430 stores the compensation data when the compensation data is generated.

Then, the optical compensation part 440 receives an optical compensation control signal from the driving mode controller 470. The optical compensation part 440 is driven in the optical compensation mode in accordance with the optical compensation control signal, and generates the compensation data for compensating the deterioration of the organic light emitting diode (OLED).

Especially, the display device according the present disclosure receives optical information from the external user terminal device 120, and generates the compensation data based on the optical information. Hereinafter, the optical compensation part 440 will be described in detail with reference to FIG. 6.

Figure 6:
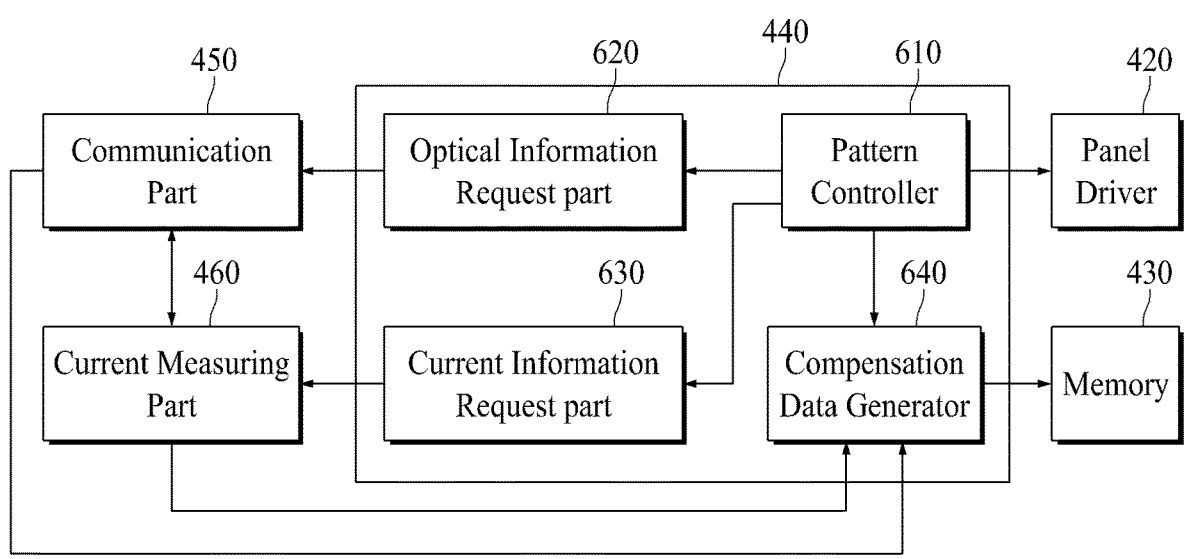
FIG. 6 illustrates an optical compensation part of FIG. 4.

FIG. 6 illustrates a diagram of the optical compensation part of FIG. 4.

Referring to FIG. 6, the optical compensation part 440 may include a pattern controller 610, an optical information request part 620, a current information request part 630, and a compensation data generator 640.

First, if it is driven in the optical compensation mode by the driving mode controller 470, the pattern controller 610 sequentially outputs pattern data for the plurality of patterns to the panel driver 420.

The plurality of patterns are previously stored in the display device 110, wherein the plurality of patterns are provided to measure the change of luminance and color coordinates in accordance with the deterioration of the organic light emitting diode (OLED). The plurality of patterns may include patterns corresponding to the plurality of data voltages. For example, the plurality of patterns may include the pattern corresponding to each of 256 data voltages, and the pattern controller 610 may sequentially output the pattern data for each pattern to the panel driver 420.

Also, at least one of color, shape and size may be differently set in the plurality of patterns.

Figure 7:
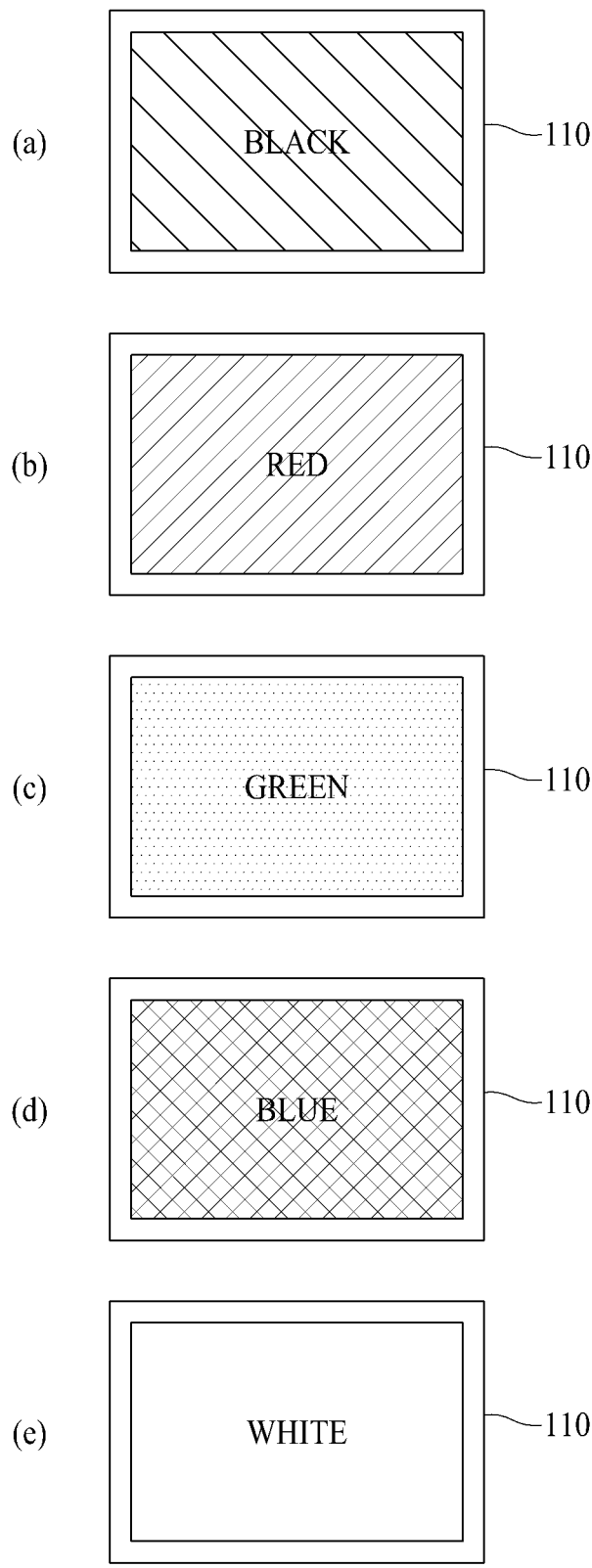
FIG. 7 illustrates a plurality of patterns according to an aspect of the present disclosure.

For example, the pattern controller 610 may sequentially output the pattern data for the plurality of patterns having the different colors to the panel driver 420. As shown in FIG. 7, black, red, green, blue, and white color may be sequentially displayed on the entire screen by the panel driver 420.

Figure 8:
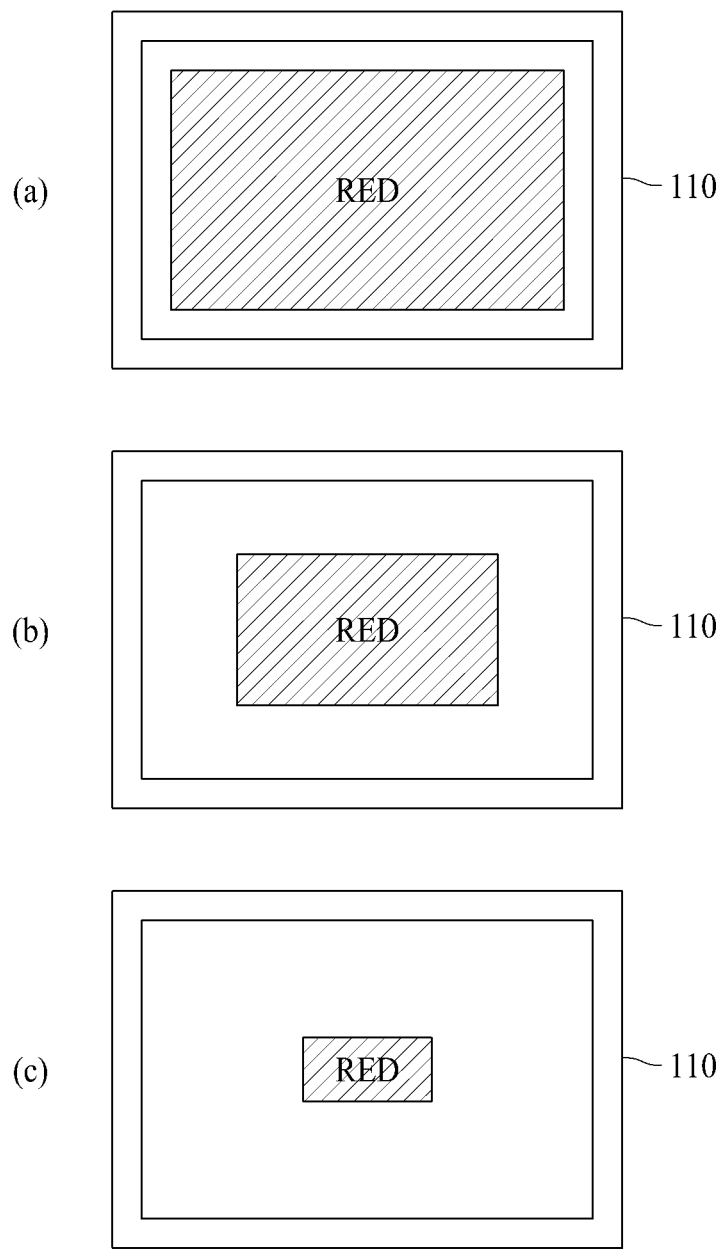
FIG. 8 illustrates a plurality of patterns according to another aspect of the present disclosure.

According to another example, the pattern controller 610 may sequentially output the pattern data for the plurality of patterns having different sizes to the panel driver 420. As shown in FIG. 8, rectangular patterns with different sizes may be sequentially displayed on the entire screen by the panel driver 420.

Figure 9:
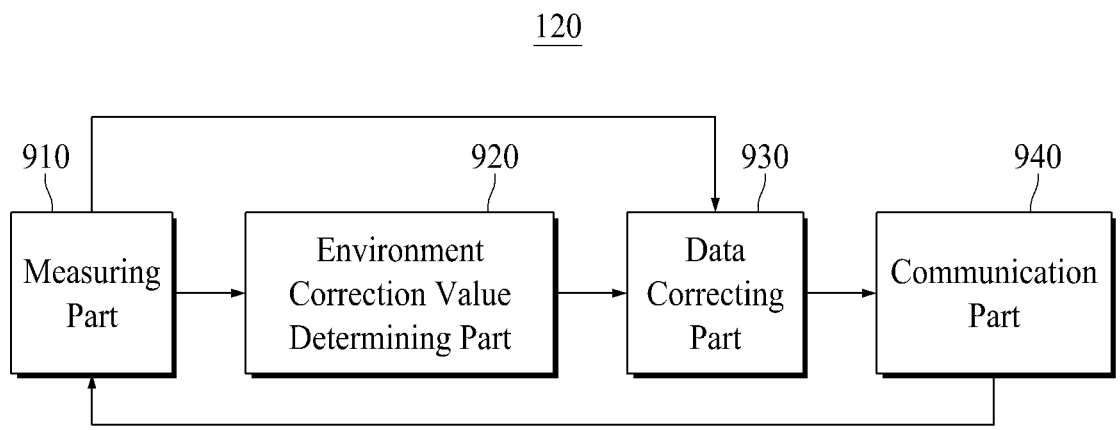
FIG. 9 illustrates a diagram of a user terminal device of FIG. 3.

Also, the plurality of patterns may include a black pattern for displaying a black color on the entire area of the display device 110. The black pattern is provided to calculate an environment correction value in the user terminal device 120, and the black pattern is displayed first with the start of the optical compensation mode. This will be described in detail with reference to FIG. 9 illustrating a diagram of the user terminal device 120.

Meanwhile, the pattern controller 610 outputs the pattern data of any one among the plurality of patterns to the panel driver 420, and also transmits a request for the optical information to the externally-provided user terminal device 120 through the optical information request part 620.

Also, the pattern controller 610 outputs the pattern data of any one among the plurality of patterns to the panel driver 420, and also transmits a request for the current information of the display panel 410 to the current measuring part 460 through the current information request part 630.

Then, the compensation data generator 640 generates compensation data for compensating the deterioration of the organic light emitting diode (OLED) by the use of current information and optical information for the pattern displayed on the display panel 410.

More specifically, the compensation data generator 640 receives the optical information for the pattern through the communication part 450. In this case, the optical information includes luminance data and color coordinates data for the pattern displayed on the display panel 410.

The compensation data generator 640 receives the current information from the current measuring part 460. In this case, the current information may include current data flowing in the display panel 410 when the pattern is displayed on the display panel 410.

The compensation data generator 640 receives the pattern data for the pattern displayed on the display panel 410 from the pattern controller 610.

The compensation data generator 640 generates the compensation data for compensating the deterioration of the organic light emitting diode (OLED) by the use of pattern data, luminance data, color coordinates data, and current data for the pattern displayed on the display panel 410. The compensation data generator 640 may calculate the compensation data based on the pattern data, luminance data, color coordinates data, and current data by the use of predetermined algorithm.

The compensation data generator 640 stores the generated compensation data in the memory 430. The initially-set data, which is previously set before shipment of fully manufactured products, is stored in the memory 430. The compensation data generator 640 changes the initially-set data into the compensation data, and stores the compensation data in the memory 430.

Referring back to FIG. 4, the communication part 450 communicates with the external user terminal device 120 by wire or by wireless. The communication part 450 transmits the optical information request to the user terminal device 120, and receives the optical information.

Then, the current measuring part 460 measures the current flowing in the display panel 410, and provides the current data corresponding to the measured data to the compensation data generator 640.

The driving mode controller 470 controls the driving mode for the display device 110.

The driving mode controller 470 determines the driving mode for the display device 110 from the image display mode and the optical compensation mode. If the image display mode is determined as the driving mode for the display device 110, the panel driver 420 receives the image data from the external terminal device 120 under the control of the driving mode controller 470.

Meanwhile, if the driving mode controller 470 receives the optical compensation request from the user terminal device 120, or after a lapse of predetermined time period, the driving mode for the display device 110 is changed from the image display mode to the optical compensation mode.

The driving mode controller 470 may receive the optical compensation request from the user terminal device 120. That is, if a user makes a decision for the optical compensation of the display device 110, a user may request the optical compensation for the display device 110 through the use of user terminal device 120. If the driving mode controller 470 receives the optical compensation request from the user terminal device 120, the driving mode controller 470 changes the image display mode into the optical compensation mode, and carries out the optical compensation for the display device 110.

After a lapse of predetermined time period, the driving mode controller 470 changes the driving mode for the display device 110 from the image display mode to the optical compensation mode, and starts the optical compensation. In this case, the predetermined time period may be previously set in consideration of a deterioration speed of the organic light emitting diode (OLED), or may be set in the user terminal device 120 by a user. For example, the driving mode controller 470 changes the driving mode for the display device 110 from the image display mode to the optical compensation mode in one-year cycle, to thereby carry out the optical compensation for the display device 110.

FIG. 9 illustrates a diagram of the user terminal device shown in FIG. 3.

Referring to FIG. 9, the user terminal device 120 according to an aspect of the present disclosure may include a measuring part 910, an environment correction value determining part 920, a data correcting part 930, and a communication part 940.

First, if the measuring part 910 receives the optical information request from the display device 110, the measuring part 910 measures the luminance and color coordinates for the pattern displayed in the display device 110.

According to an aspect of the present disclosure, the measuring part 910 may include a light-receiving element, and a color filter provided on the light-receiving element. The measuring part 910 may separate a color from incident light of pattern provided from the display device 110 through the use of color filter, and may measure the color coordinates and luminance by absorbing the light from which color is separated through the use of light-receiving element.

Then, the environment correction value determining part 920 determines an environment correction value in consideration of environment factors, for example, external light and an error of measuring device.

The environment correction value determining part 920 determines the environment correction value based on the luminance for the black pattern. The luminance for the black pattern should be '0'. However, the measured luminance for the black pattern, which is measured by the measuring part 910, is larger than '0' due to external light and an error of measuring device. In order to reduce the error, the environment correction value determining part 920 determines the environment correction value based on a luminance value measured when the black pattern is displayed in the display device 110.

Then, the data correcting part 930 corrects the luminance data and color coordinates data by the use of environment correction value. The data correcting part 930 corrects the luminance data by subtracting the environment correction value from the luminance value measured by the measuring part 910.

Then, the communication part 950 communicates with the display device 110 by wire or by wireless. The communication part 950 receives the optical compensation request from the display device 110, and transmits the optical information for the request, and more particularly, the luminance data and color coordinates data corrected by the data correcting part 930 to the display device 110.

Figure 10:
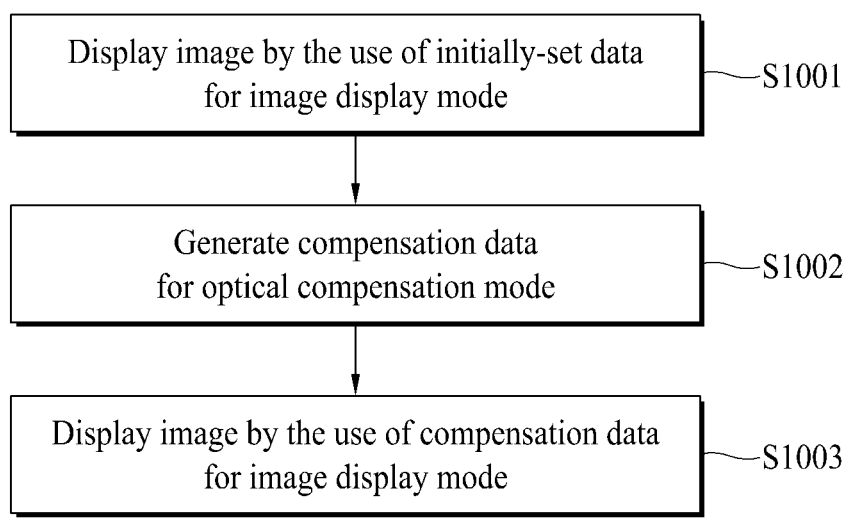
FIG. 10 is a flow chart showing a method of carrying out an optical compensation process in a display device according an aspect of the present disclosure.

FIG. 10 is a flow chart showing a method of carrying out the optical compensation in the display device according to an aspect of the present disclosure.

Referring to FIG. 10, the display device 110 according to an aspect of the present disclosure displays the image by the use of initially-set data for the image display mode (S1001).

More specifically, when the image data is input from the external terminal device 120, the panel driver 420 corrects the input image data by the use of initially-set data stored in the memory 430, to thereby generate the correction data. Then, the panel driver 420 converts the correction data into the data voltages, and supplies the data voltages to the data lines (DL). In this case, the display panel 410 emits light with a predetermined luminance in accordance with the data voltage supplied from the data line (DL), to thereby display the image.

Then, if there is the optical compensation request from the user terminal device 120, or after a lapse of predetermined time period, the display device 110 changes the driving mode from the image display mode to the optical compensation mode. Then, the display device 110 generates the compensation data for compensating the deterioration of the organic light emitting diode (OLED) (S1002).

Hereinafter, a method of generating the compensation data will be described in detail with reference to FIG. 11.

Figure 11:
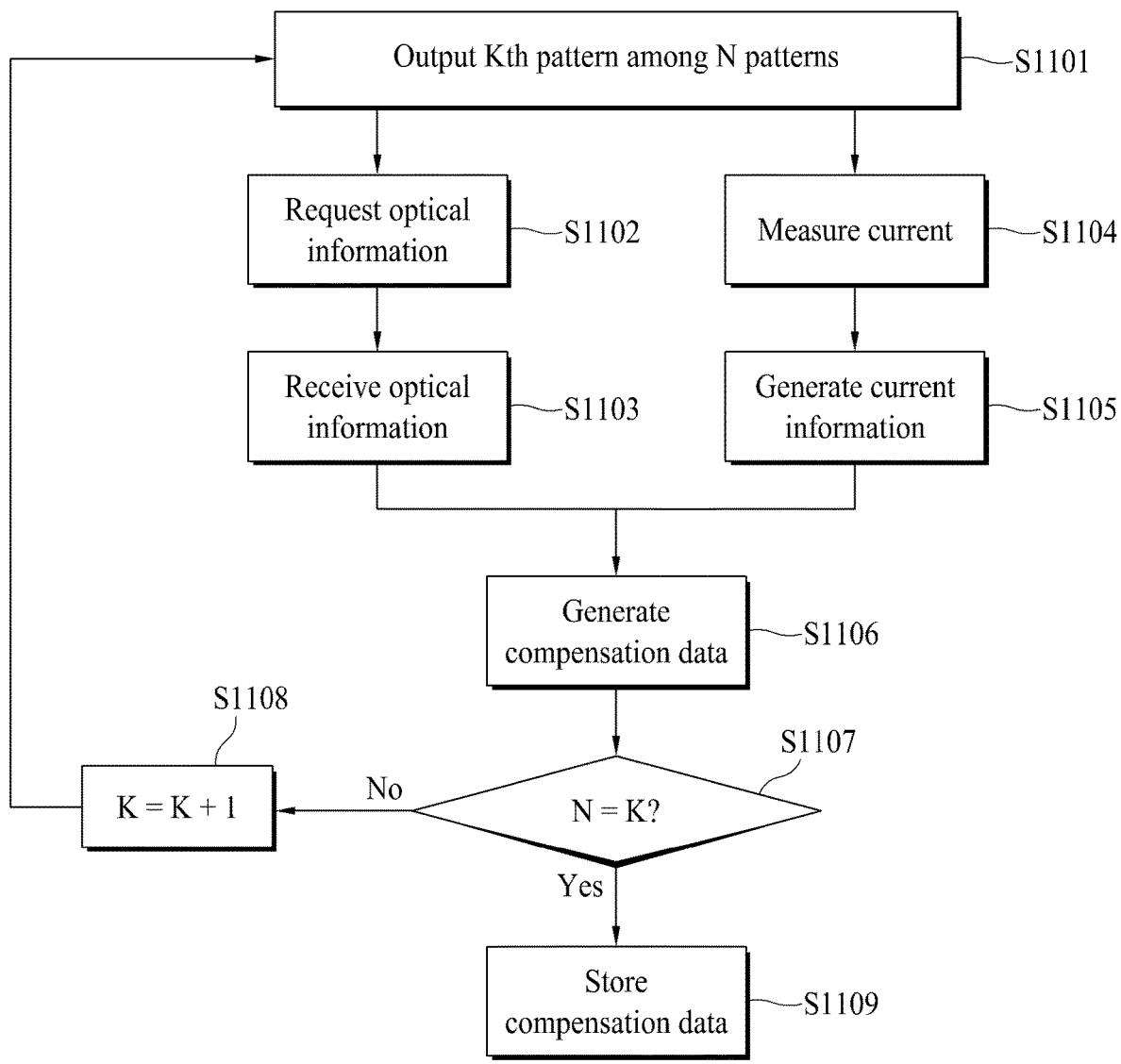
FIG. 11 is a flow chart showing a method of generating compensation data in the display device according an aspect of the present disclosure.

FIG. 11 is a flow chart showing a method of generating the compensation data in the display device according to an aspect of the present disclosure.

Referring to FIG. 11, if the driving mode is changed from the image display mode to the optical compensation mode, the display device 110 according to an aspect of the present disclosure displays a first pattern on the display panel 410 (S1101). In this case, the first pattern may correspond to the black pattern.

More specifically, the optical compensation part 440 outputs first pattern data corresponding to the first pattern to the panel driver 420. The panel driver 420 converts the first pattern data into the data voltages, and supplies the data voltages to the data lines (DL). In this case, the display panel 410 emits light with a predetermined luminance in accordance with the data voltage supplied from the data line (DL), to thereby display the first pattern.

According to another aspect of the present disclosure, the panel driver 420 corrects the first pattern data by the use of initially-set data stored in the memory 430, to thereby generate the correction data. Then, the panel driver 420 converts the correction data into the data voltages, and supplies the data voltages to the data lines (DL). In this case, the display panel 410 emits light with a predetermined luminance in accordance with the data voltage supplied from the data line (DL), to thereby display the image.

Then, the display device 110 transmits the request for the optical information to the user terminal device 120, and receives the optical information (S1102 and S1103). In this case, the optical information may include the luminance data and color coordinates data for the first pattern.

The display device 110 measures the current flowing in the display panel 410 on which the first pattern is displayed, and generates the current data corresponding to the measured current (S1104 and S1105).

The display device 110 calculates the compensation data based on the pattern data, luminance data, color coordinates data, and current data by the use of predetermined algorithm (S1106).

Then, the display device 110 repetitively carries out the steps of S1101 to S1106 for the remaining patterns (S1107 and S1108).

When the compensation data for the plurality of patterns is generated, the display device 110 stores the generated compensation data in the memory 430 (S1109).

Referring back to FIG. 10, after completing the optical compensation, the driving mode for the display device 110 is changed from the optical compensation mode to the image display mode. The display device 110 displays the image by the use of compensation data for the image display mode (S1003).

More specifically, when the image data is input from the external terminal device 120, the panel driver 420 corrects the input image data by the use of compensation data stored in the memory 430, to thereby generate the correction data. Then, the panel driver 420 converts the correction data into the data voltages, and supplies the data voltages to the data lines (DL). In this case, the display panel 410 emits light with a predetermined luminance in accordance with the data voltage supplied from the data line (DL), to thereby display the image.

Figure 12:
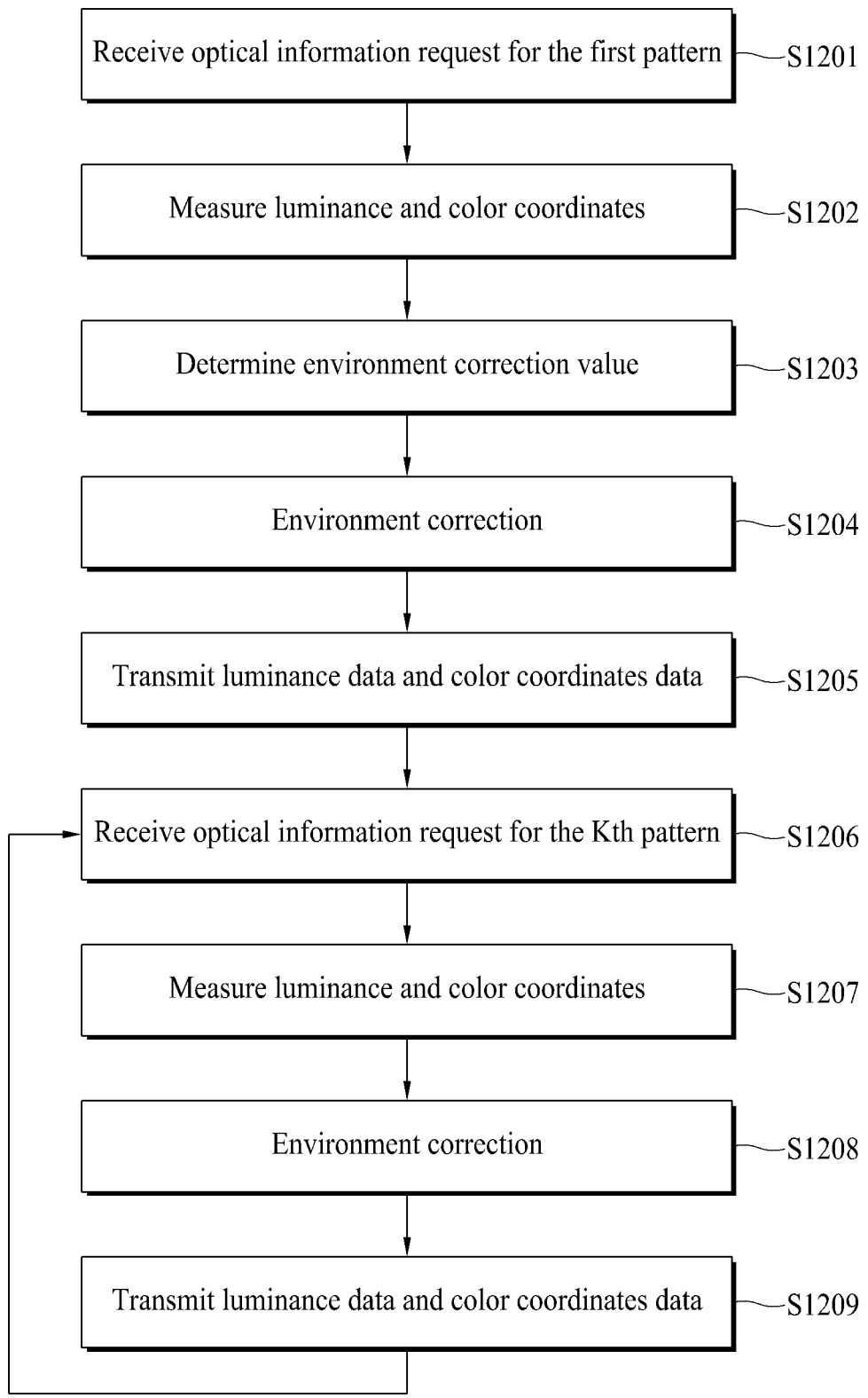
FIG. 12 is a flow chart showing a method of carrying out an optical compensation process in a user terminal device according to one aspect of the present disclosure.

FIG. 12 is a flow chart showing a method of carrying out the optical compensation in the user terminal device according to an aspect of the present disclosure.

Referring to FIG. 12, if the user terminal device 120 receives the optical information request for the first pattern from the display device 110, the user terminal device 120 measures the luminance and color coordinates for the first pattern displayed in the display device 110 (S1201 and S1202). In this case, the first pattern corresponds to the black pattern for displaying the black color on the entire display area of the display device 110.

Then, the user terminal device 120 determines the environment correction value by the use of luminance value and color coordinates value measured for the first pattern (S1203).

The user terminal device 120 corrects the measured luminance value and color coordinates value by the use of environment correction value, and generates the luminance data and color coordinates data corresponding to the corrected luminance value and color coordinates value (S1204).

The user terminal device 120 transmits the luminance data and color coordinates data to the display device 110 (S1205).

Then, when the user terminal device 120 receives the optical information request for the second pattern from the display device 110, the user terminal device 120 measures the luminance and color coordinates for the second pattern displayed in the display device 110 (S1206 and S1207).

Then, the user terminal device 120 corrects the measured luminance value and color coordinates value for the second pattern by the use of environment correction value, and generates the luminance data and color coordinates data corresponding to the corrected luminance value and color coordinates value (S1208).

The user terminal device 120 transmits the luminance data and color coordinates data to the display device 110 (S1209).

Until the optical compensation is completed, the user terminal device 120 repetitively carries out the steps of S1206 and S1209.

According to the present disclosure, the deterioration of picture quality can be compensated by a user through the use of user terminal device even after shipment of products.

Also, it is possible to provide a high-definition picture quality to a user for a long time.

It will be apparent to those skilled in the art that various modifications and variations can be made in the present disclosure without departing from the spirit or scope of the disclosures. Thus, it is intended that the present disclosure covers the modifications and variations of this disclosure provided they come within the scope of the appended claims and their equivalents.

What is claimed is:

1. A display device comprising:
    a display panel sequentially displaying a plurality of patterns in an optical compensation mode; and
    an optical compensation part receiving luminance data and color coordinates data for each of the plurality of patterns from an external user terminal device, and generating compensation data based on variations in the luminance data and the color coordinates data caused by deterioration in the display device,
    wherein the display panel displays an image in a display mode based on the compensation data generated during the optical compensation mode,
    wherein the external user terminal device measures the luminance and color coordinates data corresponding to the plurality of patterns displayed on the display panel in the optical compensation mode, and the display device changes the display mode to the compensation mode when the display device receives an optical compensation request or after a predetermined time elapses,
    wherein the plurality of patterns include a black image pattern, and
    wherein the compensation data compensating for both an external light and a measurement error is determined based on the luminance data for the black image pattern that is displayed on an entire display area of the display panel.

2. The display device according to claim 1, wherein, when image data is input, the display device generates correction data by correcting the image data based on the compensation data, converts the correction data into data voltages, and applies the data voltages to the display panel.

3. The display device according to claim 2, wherein the plurality of patterns include a pattern corresponding to each of the data voltages.

4. The display device according to claim 1, wherein the plurality of patterns are different from one another in at least one of color, shape and size.

5. The display device according to claim 1, further comprising a current measuring part measuring a current flow in the display panel, and outputting output current data based on the measured current to the optical compensation part.

6. The display device according to claim 5, wherein the optical compensation part receives the current data for each of the plurality of patterns from the current measuring part, and generates the compensation data based on the luminance data, the color coordinates data, and the current data.

7. The display device according to claim 1, further comprising a communication part communicating with the external user terminal device to transmit an optical information request to the external user terminal device and receive optical information.

8. The display device according to claim 1, further comprising a panel driver controlling the display panel to display the plurality of patterns corresponding to pattern data.

9. The display device according to claim 1, further comprising a driving mode controller determining if the display device is driven in one of a driving mode, an image display mode and an optical compensation mode.

10. An optical compensation system, comprising:
    an external user terminal device measuring luminance and color coordinates; and
    a display device sequentially displaying a plurality of patterns, receiving luminance data and color coordinates data for each of the plurality of patterns from the external user terminal device, and generating compensation data based on variations in the luminance data and the color coordinates data caused by deterioration in the display device and storing the compensation data,
    wherein the display device displays an image in a display mode based on the compensation data generated during an optical compensation mode,
    wherein the external user terminal device measures the luminance and color coordinates data corresponding to the plurality of patterns displayed on the display panel in the optical compensation mode, and the display device changes the display mode to the compensation mode when the display device receives an optical compensation request or after a predetermined time elapses,
    wherein the plurality of patterns include a black image pattern, and
    wherein the external user terminal device determines an environment correction value compensating for both an external light and a measurement error based on the luminance and color coordinates data for the black image pattern that is displayed on an entire display area of the display panel, and corrects the measured luminance and color coordinates based on the environment correction value.

11. The optical compensation system according to claim 10, wherein the user terminal device includes a measuring part which includes a light-receiving element, a color filter on the light-receiving element, wherein the measuring part measures the luminance and the color coordinates by absorbing light of the patterns displayed in the display device.

12. The optical compensation system according to claim 10, wherein the display device includes:
- a display panel sequentially displaying the plurality of patterns; and
- an optical compensation part measuring a current flow in the display panel, and generating compensation data based on the luminance data, the color coordinates data, and current data corresponding to the measured current.

13. An optical compensation method, comprising:
displaying an image based on initially-set data for an image display mode;
sequentially displaying a plurality of patterns if the image display mode is changed into an optical compensation mode;
receiving luminance data and color coordinates data for each of the plurality of patterns from an external user terminal device;
generating compensation data based on variations in the luminance data and the color coordinates data caused by deterioration in a display device and storing the compensation data; and
displaying an image based on the compensation data if the optical compensation mode is changed into the image display mode,
wherein the luminance and color coordinates data corresponding to the plurality of patterns displayed on the display device are measured by an external user terminal device in the optical compensation mode, and the display device changes the display mode to the compensation mode when the display device receives an optical compensation request or after a predetermined time elapses,
wherein the plurality of patterns include a black image pattern, and
wherein the compensation data compensating for both an external light and a measurement error is determined based on the luminance data for the black image pattern that is displayed on an entire display area of the display panel.

14. The optical compensation method according to claim 13, wherein a first pattern of the plurality of patterns correspond to a black pattern.

15. The optical compensation method according to claim 13, wherein the stored compensation data is converted into data voltages to be supplied to a plurality of data lines.

16. The optical compensation method according to claim 15, wherein the image is displayed based on the data voltages.

17. An optical compensation method using an external user terminal device and a display device, comprising:
(a) receiving an optical compensation request for a first pattern from the display device;
(b) measuring a luminance and color coordinates for the first pattern displayed on the display device;
(c) determining environment correction value based on the luminance and the color coordinates if a pattern displayed on the display device is the first pattern;
(d) correcting the luminance and the color coordinates based on the environment correction value;
(e) generating luminance data and color coordinates data corresponding to the corrected luminance and color coordinates;
(f) transmitting the luminance data and the color coordinates data to the display device;
(g) repeating the steps of (a) to (f) for a Kth pattern to complete an optical compensation, where K is a natural number greater than 1,
wherein the luminance and color coordinates data corresponding to the plurality of patterns including the first pattern to the Kth pattern are measured by the external user terminal device in an optical compensation mode, and the display device changes a display mode to the optical compensation mode when the display device receives an optical compensation request or after a predetermined time elapses,
wherein the first pattern is a black image pattern, and
wherein the environment correction value compensating for both an external light and a measurement error is determined based on the luminance and color coordinates data for the black image pattern that is displayed on an entire display area of the display panel.

* * * * *